March 10, 1970    F. SOMMER    3,500,160
ARRANGEMENT FOR BRINGING A ROTATING SYSTEM CONTROLLED BY
MEANS OF A SERVO-SYSTEM INTO PHASE
AND KEEPING IT IN PHASE
Filed April 22, 1968    2 Sheets-Sheet 1

INVENTOR.
FRIEDRICH SOMMER
BY
AGENT

United States Patent Office

3,500,160
Patented Mar. 10, 1970

3,500,160
ARRANGEMENT FOR BRINGING A ROTATING SYSTEM CONTROLLED BY MEANS OF A SERVO-SYSTEM INTO PHASE AND KEEPING IT IN PHASE
Friedrich Sommer, Vienna, Austria, assignor, by mesne assignments, to U.S. Philips Corporation, New York, N.Y., a corporation of Delaware
Filed Apr. 22, 1968, Ser. No. 722,845
Claims priority, application Austria, Apr. 26, 1967,
A 3,935/67
Int. Cl. H02p 5/04
U.S. Cl. 318—302                           3 Claims

ABSTRACT OF THE DISCLOSURE

A system for synchronizing and regulating the speed of a rotating member comprises a source of reference pulses and a source of control pulses of a frequency proportional to the shaft speed. The reference and control pulses are alternately applied to the inputs of a first bistable device via first and second gates that are controlled by a one-shot multivibrator. The output of the bistable device is used to regulate the shaft speed. The reference and control pulses are applied to the input of the one-shot multivibrator via third and fourth gates. The reference and control pulses are alternately applied to the input of a second bistable device which controls the condition of the third and fourth gates to prevent the passage of the reference and control pulses to the one-shot multivibrator so long as they are of the same frequency. A change in speed changes the frequency of the control pulses so that the one-shot multivibrator is triggered. The output of the one-shot multivibrator controls the first and second gates so as to alter the periods of the first bistable device, which in turn readjusts the shaft speed to bring same into synchronism.

---

Figure 1:
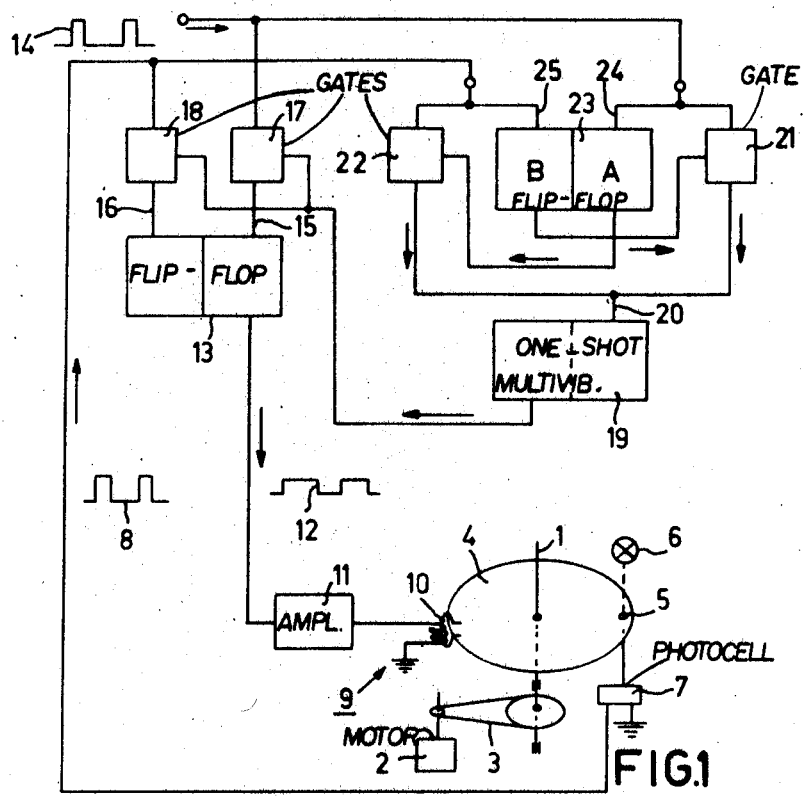

The present invention relates to an arrangement for bringing a rotating system controlled by means of a servo-system into phase and keeping it in phase. In this arrangement a regulating member is provided for adjusting the speed of the rotating system. This member is controlled by a bistable multivibrator which is caused to change from a first stable state to a second stable state by pulses of a reference signal and to change from the second stable state to the first by pulses of a control signal derived from the rotating system. Such an arrangement is capable of first bringing the rotating system from an out-of-synchronism condition which may occur, for example, during starting or after variations of the operating conditions and in which the frequency of the control signal is different from that of the reference signal, into a condition in which the two signals have the same frequency. Once this condition has been reached, the servo-system ensures that a fixed relationship is maintained between the speed of the rotating system and the reference signal. Such arrangements are known; they may use, for example, counters having at least three positions or stores, as described in the German patent specification No. 1,147,297.

According to the invention, such an arrangement which is very simple and absolutely reliable is obtained in that each input of the bistable multivibrator is preceded by a gate circuit. These gate circuits are controlled by a monostable multivibrator in the stable state of which both gates are open and in the astable state of which both gates are closed for a time different from the period of the reference signal, and to the input of which the reference signal and the control signal are applied each through a further gate. These further gates are controlled by a bistable multivibrator to one input of which the reference signal is applied and to the other input of which the control signal is applied. The further gate through which the control signal is applied to the monostable multivibrator is closed by that stage of the bistable multivibrator which is caused to change state by the reference signal, and the further gate through which the reference signal is applied to the monostable multivibrator is closed by that stage of the bistable multivibrator which is caused to change state by the control signal. Thus the time sequence of the pulses of the control signal and of the reference signal is used as a criterion to decide whether the two signals are at the same frequency or at different frequencies, the bistable multivibrator which controls the regulating member being influenced accordingly.

Advantageously the inputs of the bistable multivibrator which controls the further gates are connected to the corresponding outputs of the first-mentioned gates. This ensures that the rotating system is brought into synchronism with even greater certainty.

A particularly simple arrangement is obtained by using the bistable multivibrator which serves to control the regulating member also for controlling the further gates which precede the input of the monostable multivibrator. Thus, a single bistable multivibrator fulfils two functions, i.e. it controls the regulating member and the further gates.

Figure 2A:
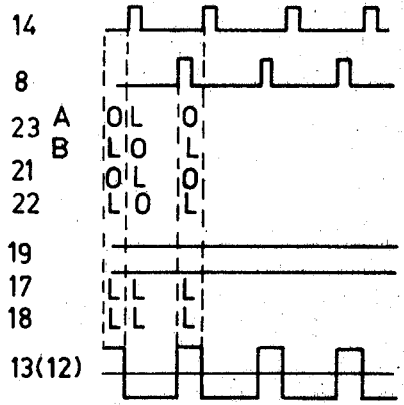
Figure 2B:
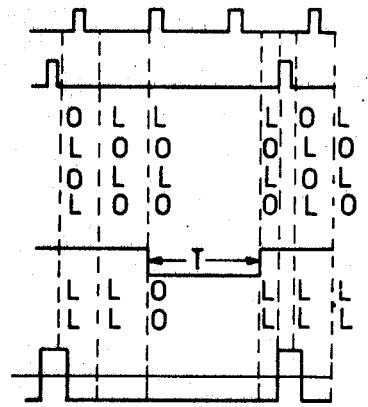
Figure 3:
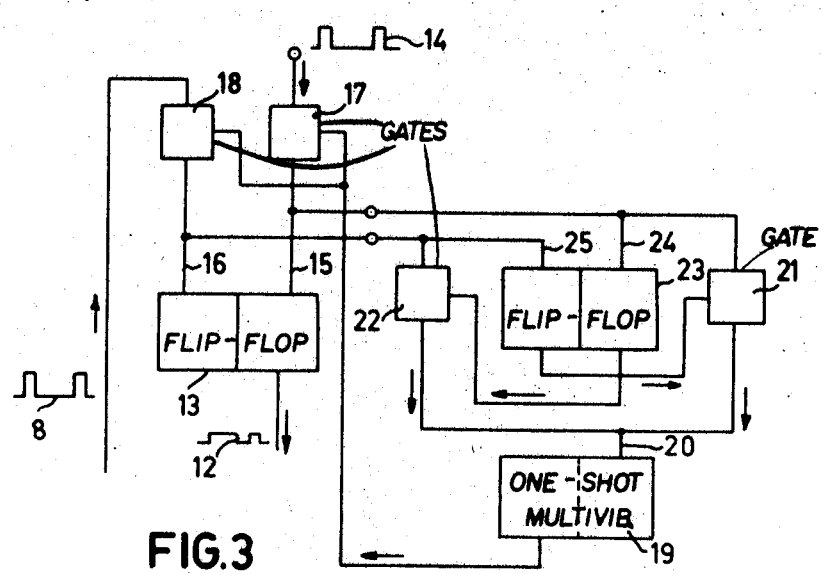
Figure 4:
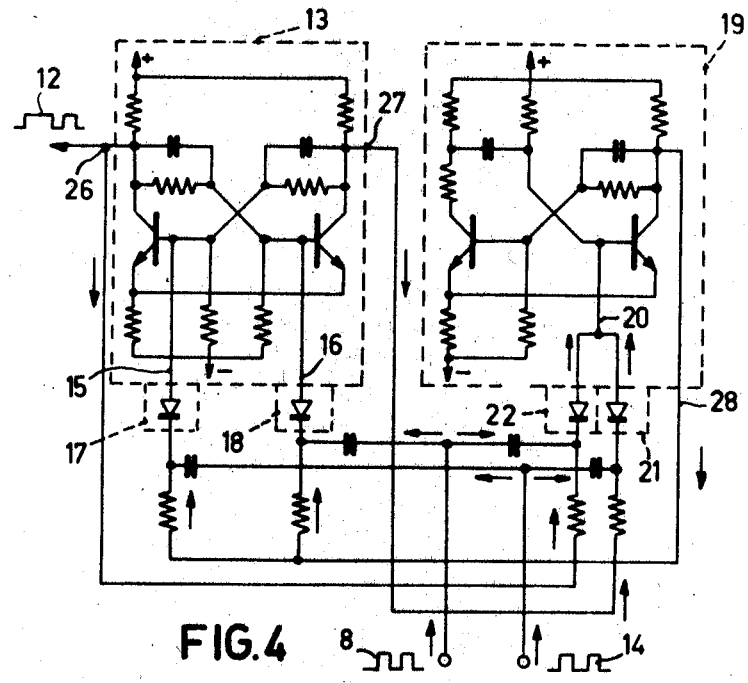

In order that the invention may readily be carried into effect, embodiments thereof will now be described, by way of example, with reference to the accompanying diagrammatic drawings, but the invention is not limited to these embodiments. In the drawings, FIGURE 1 is a block-diagram of an arrangement in accordance with the invention and FIGURES 2a and 2b are diagrams illustrating the time sequence of the separate events. FIGURE 3 is a block-diagram of a more elaborate embodiment of the arrangement shown in FIGURE 1, and FIGURE 4 shows an even more refined practical arrangement.

In the arrangement shown in FIGURE 1, the rotating system is a driving shaft 1, for example, a capstan for driving a magnetic tape, or an associated rotating magnetic head system or the like. The shaft is driven by a motor 2 through a belt 3. A disc 4 having an aperture 5 is secured to the shaft. An electric incandescent lamp 6 and a photosensitive element, for example, a photoelectric cell 7, are arranged each on one side of the disc. Thus, in known manner an electric pulse is produced at each revolution of the disc. The sequence of these pulses forms a control signal 8 which depends upon the speed of the rotating system.

In order to adjust the speed of the rotating system to the desired value, a regulating member 9 is provided in known manner in the form of an eddy-current brake 10 which acts on the disc 4 and is fed by a device 11 for amplifying and/or converting a regulating signal 12. The regulating signal required for controlling the device 11 is supplied by a bistable multivibrator 13 which is caused to pass from the first stable state to the second by pulses of a reference signal 14, which is a measure of the desired speed of the rotating system, and is caused to return from the second stable state to the first by pulses of the control signal 8. This multivibrator together with a low-pass filter included in the device 11 forms a phase detector which in the synchronized condition determines the phase difference between the reference signal and the control signal and provides a regulating signal which ensures a contact phase relationship between the two signals so that the rotating system is maintained in synchronism.

Considering, for example, the starting of such a system, the pulses of the control signal initially appear at large intervals during each of which a comparatively large number of pulses of the reference signal appear. This means that the frequency of the two signals is still different. As is known, such a system can only be made to fall into synchronism by means of a special arrangement which ensures that, to begin with, the frequencies of the two signals are made equal. When, in a previously synchronized system, synchronism is lost, for example, owing to large load variations, such a device is also required to restore synchronism.

According to the invention, each input 15, 16 of the bistable multivibrator 13 is preceded by a gate circuit 17 and 18, respectively, which are controlled by a monostable multivibrator 19. The arrangement is such that in the stable state of the monostable multivibrator both gates are open but in its astable state they are both closed. In order to influence the state of the monostable multivibrator 19, there are applied to its input 20 through further gates 21 and 22 the reference signal 14 and the control signal 8, respectively, any pulse applied to its input 20 causing it to pass to the astable state. These further gates 21 and 22 are controlled by a bistable multivibrator 23 to one input 24 of which is applied the reference signal and to the other input 25 of which is applied the control signal. The gate 22 through which the control signal is applied to the monostable multivibrator 19 is closed by the stage A of the bistable multivibrator 23, which stage is caused to change state by the reference signal 14, while the gate 21 through which the reference signal 14 is applied to the monostable multivibrator 19 is controlled by the stage B of the bistable multivibrator 23, which stage is caused to change state by the control signal 8.

The operation of the above-described arrangement will now be explained with reference to FIGURE 2, starting from the synchronized condition of the system shown in FIGURE 2a. The first line shows the train of pulses of the referenced signal 14 and the second line shows the control signal 8. As will be seen, the two signals have the same frequency; each pulse of the reference signal is followed by a pulse of the control signal, and so on. The following lines show the states of the various elements, the closed or blocked condition being shown by a 0 and the open or conducting condition by an L. A short time before a pulse of the reference signal is received, the stage A of the multivibrator 23 is blocked (0), its stage B is conducting (L), the gate 21 is closed, the gate 22 is open, the monostable multivibrator 19 is in its stable state and hence the gates 17 and 18 are open. The bistable multivibrator 13 is in its first stable state. This means that the pulse of the reference signal which is now received finds the gate 21 closed, so that the monostable multivibrator 19 cannot be caused to change state and hence the gates 17 and 18 remain open. Through the gate 17 the pulse of the reference signal thus reaches the bistable multivibrator 13 and causes it to pass to its second stable state. Simultaneously the bistable multivibrator 23 is caused to change state so that now its stage A becomes conducting and its stage B is blocked, which results in that the gate 22 is closed and the gate 21 is opened.

The next pulse to appear is a pulse of the control signal. It finds the gate 22 closed so that the monostable multivibrator 19 is not caused to change state and hence the gates 17 and 18 remain open. Through the gate 18 the pulse reaches the bistable multivibrator 3 and causes it to pass from its second stable condition to its first. In the bistable multivibrator 23 the pulse of the control signal renders the stage B conducting, blocks the stage A and hence closes the gate 21 and opens the gate 22.

The next pulse to appear is again a pulse of the reference signal, which also finds the gate 21 closed. Hence, in this synchronized condition of the system, the monostable multivibrator 19 always remains in its stable state and hence the gates 17 and 18 remain open. In accordance with the reception of the pulses of the two signals the bistable multivibrator 13 delivers the pulse train 12 for controlling the regulating member.

In FIGURE 2b the system is assumed to be starting. In this condition, the frequency of the reference signal is materially higher than that of the control signal, which may, for example, show itself in the occurrence of three pulses of the reference signal 14 between two pulses of the control signal 8. Upon the occurrence of the pulse of the control signal the following condition obtains. The stage A of the bistable multivibrator 23 is blocked, the stage B is conducting, hence the gate 21 is closed and the gate 22 is open. The monostable multivibrator 19 is in its stable state, the gates 17 and 18 are open and the bistable multivibrator 13 is in its first stable state.

Consequently, the next pulse of the reference signal finds the gate 21 closed, the monostable multivibrator 19 remains in its stable state and hence the gates 17 and 18 remain open and the bistable multivibrator 13 is caused to pass to its second stable state. Furthermore, as FIGURE 2a shows, the bistable multivibrator 23 is caused to change state and hence the gate 21 is opened and the gate 22 is closed. The next pulse to appear, however, is a pulse of the reference signal. This now finds the gate 21 open so that the pulse reaches the monostable multivibrator 19 and causes it to pass to its astable state so that the gates 17 and 18 are closed. Thus, this pulse of the reference signal cannot cause the bistable multivibrator 13 to change state, so that this multivibrator remains in its second stable state in which the regulating signal produced by it tends to accelerate the rotating system. Obviously it must be ensured by the use of matching elements that the gates 17 and 18 are closed in time, before the incoming pulses can causes the bistable multivibrator 13 to change state.

When after the time T the monostable multivibrator 19 returns to its stable state, the gates 17 and 18 are opened again and the subsequent operation depends on which pulse will be the next to appear. If, as is shown in FIGURE 2b, a pulse of the control signal appears, it will find the gate 22 closed so that the gates 17 and 18 remain open and the bistable multivibrator 13 is caused to pass to its first stable state. If subsequently a pulse of the reference signal is received, further operation will be as described with reference to FIGURE 2a. Obviously, there may be cases in which the rotating system is not brought into synchronism by a single response of the monostable multivibrator 19 but only after the cycle has been repeated one or more times. This will depend, amongst other things, from the choice of the time T, which may be shorter than the period of the reference signal, for example, may be about ⅓ thereof.

If, however, after the monostable multivibrator 19 has returned to its stable state another pulse of the reference signal should be received, it would find the gate 21 open and hence would immediately cause the monostable multivibrator 19 to change state so that the gates 17 and 18 would be closed and hence the bistable multivibrator 13 would remain in its second stable state.

As will be appreciated, the arrangement described causes the bistable multivibrator 13 to change state continually only if the pulses of the reference signal and of the control signal are alternately received, whereas otherwise the time constant of the monostable multivibrator 19, which time constant determines the duration T of the astable state of this multivibrator, ensures that the bistable multivibrator 13 in any case remains in its latest state for a time corresponding to the time constant. This results in that the rotating system automatically is given time to be brought into synchronism and is not prevented from being synchronized by the bistable multivibrator 13 continually changing state as a result of an inconvenient succession of the pulses.

With respect to the choice of the duration T of the astable state of the monostable multivibrator 19, attention should be paid to the fact that this obviously must not be equal to the period of the reference signals, since otherwise the gates 17 and 18, once they had been closed by the reference signal, will always be closed again, since in this event the next pulse will always have to be a reference pulse. With this exception the duration of the astable state of the monostable multivibrator 19 is not critical. Obviously it must be made to match the properties of the servo-system, for example, the mechanical time constant thereof, the bandwidth of the regulating circuit and the like, to effect optimum synchronisation.

If in the arrangement shown in FIGURE 1, during the astable state of the monostable multivibrator 19, a pulse is received of the signal which has not caused the multivibrator to change state, the bistable multivibrator 23 will change its state, causing a change in the states of the gates 21 and 22. On termination of the period during which the gates 17 and 18 are closed, the next pulse to be received will be compared with a different initial state. This may result in the servo-system requiring slightly more time to come into synchronism. In the arrangement shown in FIGURE 3, this is avoided in that the bistable multivibrator 23 and the gates 21 and 22 are not directly connected to the supply leads for the reference and control signals but are connected instead to the outputs of the gates 17 and 18. This provides the advantage that the bistable multivibrator 23 can only receive pulses when the monostable multivibrator 19 has ascertained that there is no unsuitable succession of pulses and hence the gates 17 and 18 are open. For in this case the bistable multivibrator 23 and the gates 21 and 22 remain in the states which obtained at the instant at which the monostable multivibrator 19 was caused to change state. Hence, on termination of the period during which the gates 17 and 18 are closed, the next pulse is again compared with a pulse which has caused the blocking or closure.

In the arrangement shown in FIGURE 4, the two bistable multivibrators are combined to form a single bistable multivibrator 13. The two signals 8 and 14 are applied to the gates 18, 22 and 17, 21, respectively. The alternate closure of the gates 21 and 22 is effected from the outputs 15 and 16 of the bistable multivibrator 13 and the simultaneous closure of the gates 17 and 18 is effected from the output 28 of the monostable multivibrator 19, as is indicated by arrows. The regulating signal 12 is taken from the output 26. The operation of the arrangement is similar to that of the above described embodiment.

What is claimed is:

1. An arrangement for bringing a rotating system controlled by means of a servo-system into phase and keeping it in phase comprising, a source of reference signal pulses, a source of control signal pulses derived from the rotating system, a regulating member for adjusting the speed of the rotating system and controlled by a first bistable multivibrator which is caused to pass from its first stable state to its second stable state by said reference signal pulses and is caused to pass from its second stable state to its first stable state by said control signal pulses, a gate circuit coupled to each input of the bistable multivibrator, a monostable multivibrator connected to control said gate circuits so that in the astable state both gate circuits are in the closed condition during a time different from the period of the reference signal, means for applying to the input of the monostable multivibrator the reference signal pulses and the control signal pulses each through a further gate circuit, said further gate circuits being controlled by a second bistable multivibrator to one input of which the reference signal is applied and to the other input of which the control signal is applied, the further gate circuit through which the control signal is applied to the monostable multivibrator being closed by that stage of the second bistable multivibrator which is caused to change state by the reference signal, whereas the further gate circuit through which the reference signal is applied to the monostable multivibrator is closed by that state of the second bistable multivibrator which is caused to change state by the control signal.

2. An arrangement as claimed in claim 1, further comprising means connecting the inputs of the second bistable multivibrator which controls the further gate circuits to the corresponding outputs of the first-mentioned gate circuits.

3. An arrangement as claimed in claim 2, further comprising circuit means coupling the first bistable multivibrator in circuit so as to control said further gate circuits which are coupled to the input of the monostable multivibrator.

References Cited

UNITED STATES PATENTS

| | | | |
|---|---|---|---|
| 3,154,730 | 10/1964 | Houldin et al. | 318—318 X |
| 3,184,606 | 5/1965 | Ovenden et al. | 307—233 X |
| 3,200,340 | 8/1965 | Dunne | 307—232 X |

ORIS L. RADER, Primary Examiner

L. L. HEWITT, Assistant Examiner

U.S. Cl. X.R.

318—314, 318